2,990,370
LUBRICATING COMPOSITION
Troy L. Cantrell, Drexel Hill, and Herschel G. Smith, Wallingford, Pa., assignors to Gulf Oil Corporation, Pittsburgh, Pa., a corporation of Pennsylvania
No Drawing. Filed June 9, 1958, Ser. No. 740,564
3 Claims. (Cl. 252—52)

This invention relates to compounded mineral oil lubricants, and more particularly it relates to compounded mineral oil lubricants that possess improved resistance to oxidative deterioration.

In the lubrication of internal combustion engines of all types, particularly when severe operating conditions are encountered, plain mineral lubricating oils often prove unsatisfactory in service because of the oxidative deterioration of the oil, with the attendant deposition on the engine surfaces of varnish, gum or sludge.

The formation of varnishes, gums and sludges on engine surfaces is due at least in part to oxidation effects on mineral lubricating oils. In turbine oils the problem of oxidation is further aggravated because in normal use turbine oils rapidly become contaminated with water.

We have found that the resistance of mineral oil lubricants to oxidative deterioration can be improved by incorporation therein of a small amount of an addition agent prepared by condensing approximately equimolar proportions of formaldehyde and a monohydric, alkylated phenol that contains at least one unsubstituted nuclear carbon atom, preferably in the ortho or para position, and whose alkyl groups contain 8 carbon atoms each, in the presence of an acid activated, montmorillonite clay catalyst at a temperature in the range of about 50° F. to 350° F. Addition agents prepared from octylphenols are especially important for the purposes of this invention. Ordinarily it is preferred to use from 5 to 10 percent by weight of the acid-activated, montmorillonite clay catalyst, based on the monohydric, alkylated phenol reactant. However, smaller amounts for example, as low as 1 percent by weight, and larger amounts, for example as high as 20 percent by weight, can be employed, but such larger amounts are ordinarily not necessary. The present invention, based on the above-described finding, relates to compounded lubricating oils containing a smal, oxidation-inhibiting amount of an addition agent prepared in the above indicated manner.

The reactants employed in producing the addition agents described herein can be reacted in any order and at any of the disclosed conditions that are effective to produce a homogeneous, oil-soluble product of good quality. According to a preferred procedure the monohydric, alkylated phenol and the acid-activated, montmorillonite catalyst are placed in a reaction vessel and heated to a temperature at least sufficient to melt the alkylated phenol, usually in the range of about 50° F. to about 150° F. The formaldehyde is then gradually added to the reaction mixture with agitation at a rate such that the temperature of the reaction mixture does not rise appreciably. After the addition of formaldehyde has been completed, the temperature of the reaction mixture is maintained above the melting point of the alkylated phenol, preferably at about 150° F. to 160° F. until the reaction is substantially complete. The reaction is substantially complete when the appearance of the reaction mixture no longer continues to change. The temperature is then raised to a degree sufficient to remove water, normally about 210° F. or above. During removal of water from the reaction mixture, the temperature should not be allowed to exceed about 350° F. in order to avoid partial decomposition of the product.

Any monohydric, alkylated phenol containing at least one unsubstituted nuclear carbon atom and whose alkyl groups contain 8 carbon atoms each can be used in the preparation of the addition agents disclosed herein. Especially outstanding results are obtained with octylphenols having an unsubstituted ortho or para position atom, such as, for example, para tetramethylbutylphenol.

In lieu of formaldehyde, any formaldehyde yielding compound, such as paraformaldehyde, dioxymethylene and trioxymethylene may be employed. In such case, the amount of formaldehyde yielding compound used is based upon the equivalent number of mols of formaldehyde yielded within the range of proportions of formaldehyde set forth hereinabove. Accordingly, the term formaldehyde is intended to include formaldehyde yielding compounds as well as formaldehyde itself.

The catalyst contemplated by this invention is an acid-treated, montmorillonite clay of the substantially non-swelling, sub-bentonite type. Characteristic examples of such clay are the so-called Cheto clays or Chambers clays coming from the vicinity of Cheto, Arizona, or Chisholm clay, coming from near Jackson, Mississippi. The Cheto clays, for example, have a characteristic analysis upon the volatile free basis as follows:

| | Percent by weight |
|---|---|
| $SiO_2$ | 67.3 |
| $Al_2O_3$ | 19.5 |
| $Fe_2O_3$ | 1.8 |
| CaO | 3.2 |
| MgO | 6.9 |
| MnO | 0.8 |
| $Na_2O$ | 0.2 |

Such clays are treated with acid ranging from about 20 pounds of $H_2SO_4$ per 100 pounds of clay (calculated as volatile free) to about 150 pounds of acid per 100 pounds of clay (calculated as volatile free). Concentrations of acid may vary from 5 percent to 60 percent calculated upon the total water of the mix including the water content of the clay. One of the purposes of the acid treatment is to remove by extraction a portion of the $Al_2O_3$ and $Fe_2O_3$, since the catalytic activity passes through a maximum when the $Al_2O_3$ and $Fe_2O_3$ content of the clay is in the region of 15 to 20 percent. Characteristic analysis of the Cheto clay previously identified on a volatile free basis following acid treatment is as follows:

| | Percent |
|---|---|
| $SiO_2$ | 71.5 |
| $Al_2O_3$ | 16.3 |
| $Fe_2O_3$ | 2.43 |
| CaO | 2.26 |
| MgO | 4.54 |

The condensation products obtained in accordance with our invention are solids. The exact nature of the chemical compositions af the condensation products is unknown, as is the exact manner in which the catalyst influences the reaction. However, regardless of any theory involved, the use of a catalyst consisting of an acid-treated montmorillonite clay of the sub-bentonite form is an essential feature of our invention. Since, if the catalyst is substituted or omitted, the resulting product does not possess the superior antioxidant properties of the composition of this invention.

The condensation products obtained in accordance with our invention are excellent addition agents for mineral oil lubricants. They are readily soluble in all types of mineral oils, that is, paraffinic, naphthenic or mixed base mineral oils and can be blended with mineral oils in high proportions to form concentrated solutions thereof which may then be diluted down to the proportions desired in the final mineral oil lubricant composition. As stated, our new addition agents are remarkably effective in inhibiting the oxidative deterioration of mineral oil lubricant compositions. For this purpose small amounts of our addition agent is generally sufficient. For example, our addition agents may be added to mineral lubricating oils in minor amounts, say from 0.001 to 1 percent by weight based on the mineral oil. Larger amounts may be used if desired, but it is ordinarily unnecessary to do so.

The following example illustrates the preparation of a preferred addition agent in accordance with this invention and an improved lubricant containing such addition agent.

*Example I*

Into a reaction vessel there was introduced one mol of 1,1,3,3-tetramethylbutylphenol (206 grams) and 14.5 grams of sulfuric acid, activated montmorillonite clay catalyst (5 percent by weight based on the octyl phenol). The catalyst was of a commercial type, supplied under the name, "Filtrol X–417." The mixture was heated to 150° F. to melt the octylphenol. To this mixture there was added dropwise one mol of 37 percent aqueous formaldehyde (85 grams). The temperature was then held to between 150° F. to 160° F. for a period of one hour. The resulting product was then heated to between 210–220° F. for twenty minutes to distill off all the water, both that added with the formaldehyde and that which was formed during the reaction. The mixture was then heated briefly to 300° F. to dry the product further. The reaction mixture was then cooled to 155° F. after which 147.5 grams of hexane was slowly added to maintain the product in fluid condition during filtering, which followed. After filtering, the hexane was removed by distillation. The resulting product had the following properties:

Appearance _____ Tacky dark amber solid.
Flash, OC: ° F. _____ 290.
Melting point: ° F. _____ 102.3.

An improved lubricating oil was prepared by blending one percent by weight of the aforementioned additive agent with ninety-nine percent by weight of a highly refined motor oil (S.A.E. 10). A comparison of the physical properties of the compounded lubricant and the base mineral oil follows:

|  | Motor Oil Base Stock | Improved Motor Oil |
|---|---|---|
| Gravity, °API | 31.6 | 31.3 |
| Viscosity, SUV, 100° F | 148.4 | 154.2 |
| Flash, OC, °F | 420 | 455 |
| Fire, OC, °F | 490 | 490 |

Although the foregoing specific example constitutes a preferred embodiment of the invention, it will be understood that the invention is not limited to the particular alkylated phenol, the particular catalyst quantities, etc., recited therein, and other $C_8$ alkylated phenols and other catalyst proportions can be employed with good results. For example, the acid-activated, montmorillonite clay catalyst can be employed in proportions of, for example, 1 percent, 10 percent and 20 percent by weight of the alkylated phenol with good results.

The additive agent of our invention was tested for ability to inhibit oxidation in mineral lubricating oil compositions by a comparison with an unimproved mineral lubrcating oil, as well as with mineral lubricating oil compositions containing in one instance an additive prepared identically as with out invention except that a catalyst was omitted, and in another instance except that another type acid catalyst was used in the preparation, i.e., phosphoric acid, and in still another instance, except that a sulfuric acid catalyst was employed. The purpose of the last three comparisons was to determine the criticality of the acid-treated, montmorillonite clay catalyst in the preparation of the additive agent of our invention. In all test samples the same lubricating oil base stock was employed, i.e., the motor oil described in Example I. In the samples which contained an addition agent, the concentration of the additive was 1 percent by weight and the motor oil base constituted 99 percent by weight. In the table of the results which follow below, sample A contained the unimproved motor oil of Example I as described herein; sample B contained the improved motor oil of Example I; sample C contained an addition agent prepared without a catalyst; and sample D contained an addition agent prepared with a phosphoric acid catalyst. The addition agent prepared with sulfuric acid was not tested as it was completely insoluble in the oil. A summary of the test results follow:

|  | Sample A | Sample B | Sample C | Sample D |
|---|---|---|---|---|
| Oxidation and Bearing Corrosion Test Using Copper-Lead Bearings: |  |  |  |  |
| Appearance | heavy tarnish | mild tarnish | heavy tarnish | heavy tarnish |
| Wt. Loss, Mg | 11 | 2 | 33 | 16 |

The test referred to in the foregoing table as, "oxidation and bearing corrosion test," is conducted as follows: An alloy bearing shell of certain commonly used standard dimensions is submerged in 300 cc. of the oil or oil composition to be tested in a 400 cc. Pyrex beaker and heated in a thermostatic oil bath to 347° F. Air is then bubbled through the oil in contact with the bearing shell at a rate of 2,000 cc. per hour. At the end of 48 hours the loss of weight and condition of the bearing shell are determined, the bearing shell being washed free of oil and dried before weighing. When determining the effectiveness of various improvement agents, the usual procedure is to run a blank test simultaneously with the oil composition being tested, employing for that purpose a sample of the untreated oil. In this test it is advantageous to employ commercial bearing shells. These shells comprise a suitable metal backing faced with the alloy bearing material. In this way the actual bearing face is subjected to severe deterioration conditions. By comparison of results of such tests with actual service tests, we have found them to be in substantial agreement as to the suitability of a particular lubricant.

In order to determine the comparative extent of oxidative deterioration of the foregoing motor oil samples following subjection to the aforementioned "oxidation and bearing corrosion test," measurments were made following the test of viscosity and total acid number in each test sample. Differences in these properties were then noted between measurements taken before and after testing. Increases in these properties are, of course, indications of oxidative deterioration. The test results:

|  | Sample A | Sample B | Sample C | Sample D |
|---|---|---|---|---|
| Viscosity, SUV, 100° F | 148.4 | 154.2 | 148.8 | 150.2 |
| Viscosity, SUV, 100° F. following "Oxidation and Bearing Corrosion Test" | 187.6 | 184.2 | 200 | 198.1 |
| Viscosity Increase | 26.0 | 19.3 | 34.4 | 31.8 |
| Total Acid No., ASTM D 974–55 T Test | 0.01 | 0.57 | 0.01 | 0.13 |
| Total Acid No., ASTM D 974–55 T Test—following "Oxidation and Bearing Corrosion Test" | 1.86 | 0.78 | 1.65 | 1.17 |
| Total Acid No., Increase | 1.85 | 0.21 | 1.64 | 1.04 |
| Carbon Residue, Conradson, Percent | 0.22 | 0.37 | 0.64 | 0.70 |

The notable effects of the addition agents disclosed herein cannot be readily accounted for and cannot be predicted from the nature of their preparation. Thus, as noted in the above table, condensation products prepared from the same reactants but using either no catalyst or a different catalyst were found to be either a prooxidant or to shown no anti-oxidant effects whatsoever.

While we have shown in the examples the preparation of compounded lubricating oils, our invention is not limited thereto but comprises all mineral oil lubricant compositions containing our new addition agent, such as greases and the like. If desired, other known addition agents may be incorporated into the lubricant compositions prepared in accordance with our invention. For example, pour point depressants, extreme-pressure agents, viscosity index improvers, and the like may be added.

Many modifications or variations of the invention as set forth herein may be resorted to without departing from the spirit or scope thereof. Accordingly, only such limitations should be imposed as are indicated in the appended claims.

We claim:

1. A mineral oil lubricant composition comprising a major proportion of a mineral lubricating oil and a small amount, sufficient to inhibit oxidative deterioration of said oil, of an addition agent prepared by reacting approximately equimolar proportions of formaldehyde and a monohydric, alkylated phenol that contains at least one unsubstituted nuclear carbon atom and whose alkyl groups contain 8 carbon atoms each, in the presence of 1 to 20 percent by weight based on the weight of said alkylated phenol of an acid-activated, montmorillonite clay catalyst, at a temperature in the range of about 50° F. to 350° F.

2. The lubricant composition of claim 1 wherein said small amount is about 0.001 to 1 percent by weight of said mineral lubricating oil.

3. The lubricant composition of claim 1 where said alkylated phenol is 1,1,3,3-tetramethylbutylphenol.

References Cited in the file of this patent

UNITED STATES PATENTS

| 2,526,490 | Lieber | Oct. 17, 1950 |
| 2,656,260 | Smith et al. | Oct. 20, 1953 |
| 2,830,025 | Knowles et al. | Apr. 8, 1958 |

OTHER REFERENCES

I. and E. Chem., July 1949, vol. 41, No. 7, pp. 1442–1446.